US008651847B2

(12) United States Patent
Hoellriegel et al.

(10) Patent No.: US 8,651,847 B2
(45) Date of Patent: Feb. 18, 2014

(54) QUICK-CHANGE BLOWING NOZZLE

(75) Inventors: Thomas Hoellriegel, Teublitz (DE); Maria Gebhardt, Schwandorf (DE)

(73) Assignee: Krones AG, Neutraubling (DE)

( * ) Notice: Subject to any disclaimer, the term of this patent is extended or adjusted under 35 U.S.C. 154(b) by 29 days.

(21) Appl. No.: 13/123,237

(22) PCT Filed: Sep. 23, 2009

(86) PCT No.: PCT/EP2009/062309
§ 371 (c)(1),
(2), (4) Date: Apr. 7, 2011

(87) PCT Pub. No.: WO2010/040639
PCT Pub. Date: Apr. 15, 2010

(65) Prior Publication Data
US 2011/0244069 A1    Oct. 6, 2011

(30) Foreign Application Priority Data

Oct. 7, 2008   (DE) .................. 10 2008 050 697

(51) Int. Cl.
*B29C 49/58*    (2006.01)
(52) U.S. Cl.
USPC ........................... 425/182; 425/529; 425/535
(58) Field of Classification Search
USPC ......................... 425/182, 529, 535
See application file for complete search history.

(56) References Cited

U.S. PATENT DOCUMENTS

| 4,818,212 A * | 4/1989 | Gibbemeyer ................. 425/529 |
| 5,454,707 A * | 10/1995 | Mitchell et al. ............... 425/535 |
| 6,027,325 A * | 2/2000 | Piotrowski .................... 425/535 |
| 6,238,200 B1 | 5/2001 | Spoetzl |
| 7,165,956 B2 * | 1/2007 | Santais et al. ................. 425/535 |
| 7,407,375 B2 * | 8/2008 | Dupuis et al. ................. 425/182 |
| 8,137,091 B2 * | 3/2012 | Fleischmann et al. ........ 425/182 |
| 2008/0166440 A1 | 7/2008 | Dujardin et al. |

FOREIGN PATENT DOCUMENTS

| DE | 33 06 510 A1 | 8/1984 |
| DE | 34 20 857 A1 | 12/1985 |
| DE | 34 25 602 A1 | 1/1986 |
| FR | 2 720 681 A1 | 12/1995 |
| WO | 2006/095099 A1 | 9/2006 |

* cited by examiner

*Primary Examiner* — Robert B Davis
(74) *Attorney, Agent, or Firm* — Novak Druce Connolly Bove + Quigg LLP

(57) ABSTRACT

A device for shaping plastic preforms into plastic containers may include a blower device that subjects the plastic preforms to a gaseous medium in order to expand the plastic preforms into plastic containers. The blower device may include a blower nozzle, which can be applied onto an opening of the plastic preforms in order to subject them to the gaseous medium. The blower device may include a carrier for the blower nozzle through which the gaseous medium can flow, and a connection mechanism in order to arrange the blower nozzle on the carrier in a removable fashion. The blower nozzle can be removed from the carrier without tools.

18 Claims, 2 Drawing Sheets

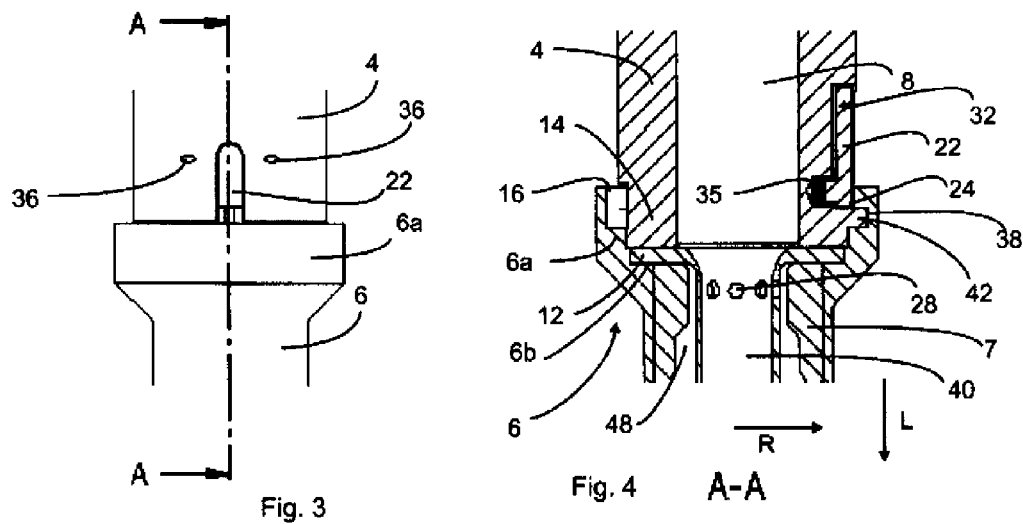
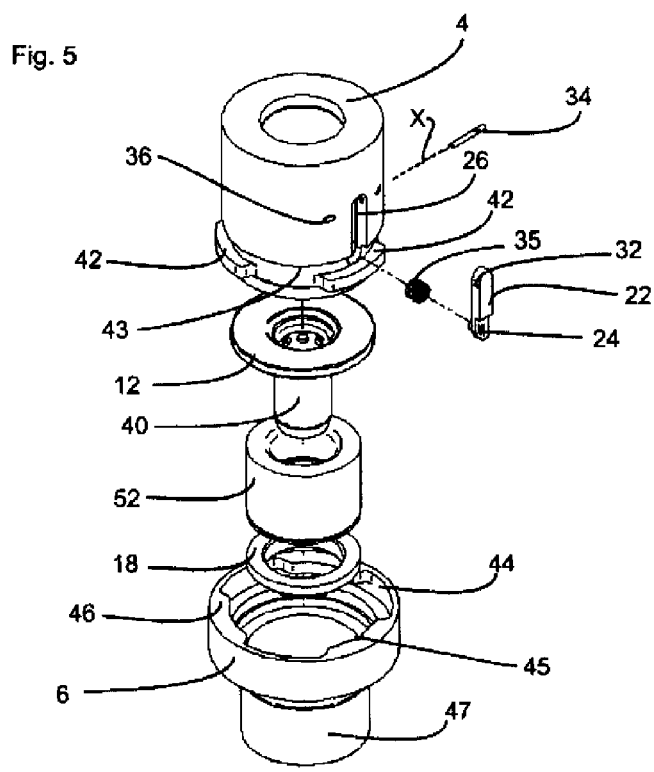

US 8,651,847 B2

QUICK-CHANGE BLOWING NOZZLE

CROSS-REFERENCE TO RELATED APPLICATIONS

This application is filed under 35 U.S.C. 371 as a U.S. national phase application of PCT/EP2009/062309, having an international filing date of Sep. 23, 2009, which claims the benefit of German Patent Application No. 10 2008 050 697.4, having a filing date of Oct. 7, 2008, both of which are hereby incorporated by reference.

TECHNICAL FIELD

The present invention relates to a blowing device for shaping plastics material pre-forms into plastics material containers.

BACKGROUND

Apparatus of this type have long been known from the prior art. In this case these blowing devices generally have a blowing nozzle which can be applied to an aperture of a pre-form in order to act upon the latter with a gaseous medium and as a result to expand it—generally against a blow mould. In this case it is possible for a plurality of different containers or pre-forms to be blown on a suitable blowing device. When changing over to a different type of container, however, it is necessary to some extent to change the blowing nozzle.

A blow moulding machine is known from DE 36 23 099 C3. In this case this blow moulding machine has a sleeve or nozzle which is capable of being inserted into the interior of a container. Changing this blowing nozzle, however, is not described in DE 36 23 099 C3.

DE 35 20 721 A1 describes a blowing mandrel for extrusion blow moulding machines. In this case it is possible for a suitable cutting sleeve to be exchanged, the sealing tightness of the corresponding blowing mandrel not being adversely affected by changing the cutting sleeve.

A clamping apparatus for blowing mandrels of blow moulding machines is known from DE 36 36 566 A1. In this case each blowing mandrel is held—in a manner movable in the longitudinal direction by way of a guide pin—on a support part fastened to a guide plate. In order to change the blowing mandrel, in this case the entire blowing mandrel can be unscrewed from the support part, but this is relatively complicated.

An adjustable blowing nozzle is known from JP 2007320133 A. In this case a contact force of the nozzle can be varied. Replacement of the nozzle itself, however, is not described in JP 2007 320 133 A.

It may be desirable to achieve a more rapid adaptation of blowing devices to different types of containers or pre-forms.

SUMMARY

An apparatus according to the invention for shaping plastics material pre-forms into plastics material containers has a blowing device which acts upon the plastics material pre-forms with a gaseous medium in order to expand the plastics material pre-forms to form plastics material containers. In addition, the blowing device has a blowing nozzle which is capable of being applied to an aperture of the plastics material pre-forms in order to act upon them with the gaseous medium. According to the invention the blowing device has a support for the blowing nozzle or part of the blowing nozzle, through which the gaseous medium is capable of flowing, and the blowing device has a connecting mechanism in order to arrange the blowing nozzle or part of the blowing nozzle on the support in a detachable manner, the blowing nozzle being capable of being removed from the support without any tools.

In this way, according to the invention, a blowing nozzle capable of being removed without any tools is proposed in order to convert an apparatus for shaping the plastics material pre-forms into plastics material containers in a rapid manner to different types of containers or different types of pre-forms. It should be noted in this case that apparatus of this type generally have a multiplicity of blowing nozzles of this type, so that a considerable saving in time is achieved by a suitably rapid and manual change or change without any tools. In this case the blowing nozzle can be produced in a multiplicity of parts. It is preferable, however, for the connecting mechanism designed in such a way that all the elements of the blowing nozzle are capable of being removed without any tools.

It is preferable for the connecting mechanism to be designed in such a way that the blowing nozzle is capable of being removed by a relative movement between the blowing nozzle and the support. In this case it would be possible for the blowing nozzle to be connected to the support by way of a screw fastening. It is preferable, however, for the blowing nozzle to be capable of being removed from the support by a relative movement between the blowing nozzle and the support, this movement preferably encompassing an angle of less than 360°, preferably less than 180°, and in a particularly preferred manner less than 120°.

In this case it is preferable for the blowing nozzle to be capable of being removed not solely by this relative movement, but by a linear movement following this relative movement, for example withdrawing the blowing nozzle from the support in the longitudinal direction of the nozzle or along an axis of rotation of the aforesaid relative movement. In this way the blowing nozzle is preferably also capable of being withdrawn from the support, it being particularly preferred in this case for no screw fastening to be provided between the blowing nozzle and the support.

In the case of a further advantageous embodiment an engagement portion, which in an assembled state of the support and the blowing nozzle engages in a receiving area of the blowing nozzle, is arranged on the support. In this case it is preferable for this engagement portion to have a circular cross-section and it is also preferable for the receiving area to have a circular cross-section, so that the engagement portion can be inserted in the manner of a telescope into the aforesaid receiving area. In this way, in this embodiment, this engagement portion and the receiving area form the connecting mechanism between the support and the blowing nozzle.

In the case of a further advantageous embodiment an engagement member capable of being moved radially with respect to the blowing nozzle is arranged on the support. In this case this engagement member preferably acts as a means for preventing rotation or as a means for preventing loosening, in order to prevent the blowing nozzle from being inadvertently detached from the support. It is preferably necessary in this case for the engagement member to be actuated in order to be able to detach the blowing nozzle and the support from each other. The engagement member is preferably also capable of being moved with respect to the support. The movement of the engagement member with respect to the support or the blowing nozzle may be both a purely radial movement and a movement such as contains further components (for example in the longitudinal direction) in addition to a radial component.

In the case of a further advantageous embodiment the engagement member has an engagement portion which engages in an area of the blowing nozzle in an assembled state of the blowing nozzle and the support. This engagement portion is used to prevent rotation and in the case of a preferred embodiment it can be actuated manually when screwing the blowing nozzle both in and out. In particular, however, manual actuation when screwing out is advantageous, it being possible in a further embodiment for the engagement portion also to engage manually during the screwing in.

In the case of a further advantageous embodiment the support has a recess in which at least one portion of the engagement member is arranged in an assembled state. This engagement results in the prevention of rotation. In addition, the engagement member can be guided during its movement by the recess (in particular in the peripheral direction of the blowing nozzle). It is preferable for the engagement member to be produced from plastics material or high-grade steel.

In the case of a further advantageous embodiment a spring element is provided, preferably on the support, and pre-stresses the engagement member with respect to the support. On account of this spring element it is made possible to prevent rotation between the blowing nozzle and the support in an assembled state.

In the case of a further advantageous embodiment the support has a retaining means which prevents the engagement member from falling out of the support. The nature of this retaining means is explained in greater detail with reference to the figures.

It is pointed out that the respective embodiment of the engagement member described can also take place in another way. In particular, it is possible for the engagement member to be arranged in the reverse manner on the blowing nozzle and for a portion of this engagement member to engage in the support. In a corresponding manner, the retaining means could also be arranged on the blowing nozzle and in the reverse manner the recess on the support.

In the case of a further advantageous embodiment the engagement member is a spherical body which, in particular, can engage in a recess which is like a hole for example. In the case of a further advantageous embodiment a plurality of engagement members are distributed around the external periphery of the support in a uniform manner. In this case, however, it is also possible for the engagement members to be arranged offset with respect to one another in the longitudinal direction of the support.

It would also be possible, however, for all the engagement members to be arranged within a circumferential angle of less than 180°, in order that they can be actuated more easily at the same time with one hand.

In the case of a further advantageous embodiment the engagement member is arranged so as to be pivotable about a pre-set pivot axle. In this case this pivot axle or a corresponding pivot shaft can be incorporated in the support or the blowing nozzle and, in particular, in the support.

In the case of a further advantageous embodiment an engagement member, which extends in the peripheral direction of the support and the external cross-section of which is adapted to an internal cross-section of an engagement recess arranged on the blowing nozzle, is arranged on the support. In this way it is possible for example for the support to have an element which is not formed in a circular shape in a radial direction and which engages in a correspondingly shaped recess in the blowing nozzle.

This arrangement is explained in greater detail with reference to the description of the figures.

In the case of a further advantageous embodiment the blowing nozzle has a receiving region into which a connecting portion of the support is capable of being inserted. In this way, the blowing nozzle is pressed onto a region of the support, at least in part in the case of this embodiment. In this case it is preferable for this receiving region to surround the connecting portion completely in a peripheral direction (with respect to the longitudinal direction of the blowing nozzle). The receiving region and the connecting portion jointly form the connecting mechanism mentioned above or part of it.

In the case of a further advantageous embodiment a sealing element is provided which seals off the support with respect to the blowing nozzle. This sealing element can be for example an O-ring. However, a seal by way of corresponding abutment faces of the support and the blowing nozzle would also be possible.

In the case of a further advantageous embodiment the apparatus is a stretching blow moulding machine. In this way, in the case of this embodiment the apparatus also has a stretching rod which for example is capable of being guided through the blowing nozzle.

The present invention further relates to a blowing device for a stretching blow moulding machine, which acts upon plastics material pre-forms with a gaseous medium in order to expand the plastics material pre-forms into plastics material containers, the blowing device having a blowing nozzle which is capable of being applied to an aperture of the plastics material pre-forms in order to act upon them with the gaseous medium. According to the invention the blowing device has a support for the blowing nozzle, which support is capable of having the gaseous medium flow through it, and the blowing device additionally has a connecting mechanism in order to arrange the blowing nozzle on the support in a detachable manner, it being possible for the blowing nozzle to be removed from the support without any tools.

In this case it is possible for an outer face of this blowing nozzle to have a textured surface so that it can be gripped more easily by a hand and can be turned with respect to the support. In this case the blowing nozzle itself can be designed in various ways. In this way, the blowing nozzle can be designed in such a way that it is capable of being inserted into an aperture of the container, but it would also be possible for the blowing nozzle to be applied to an upper edge of the container and to seal it off from the latter, and finally it would also be possible for the blowing nozzle to be applied to an outer area of the aperture, such as for example a support ring or a locking ring of the container.

BRIEF DESCRIPTION OF THE DRAWINGS

Further advantages and embodiments are evident from the accompanying drawings. In the drawings

FIG. 3 is a detailed view of a blowing device according to the invention;

FIG. 4 is a sectional view along the line A-A from FIG. 3 of the device shown in FIG. 3, and FIG. 5 is an exploded view of the detail shown in FIG. 3.

DETAILED DESCRIPTION

Figure 1:
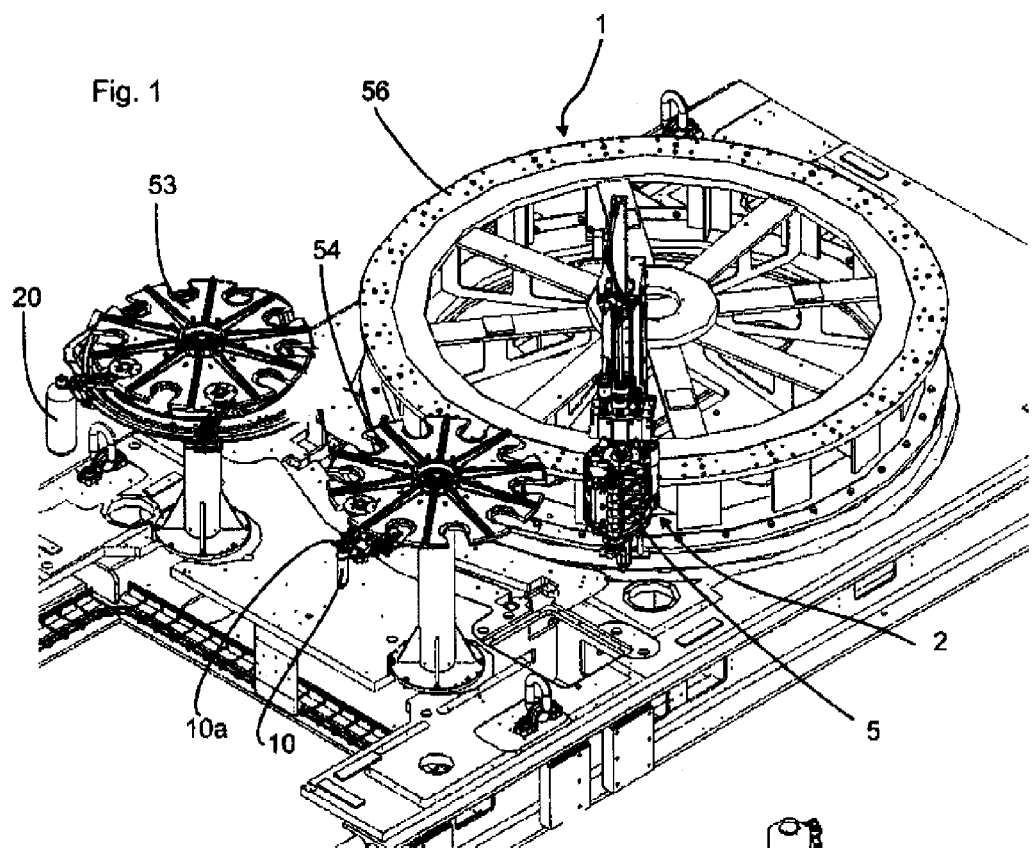
FIG. 1 is a view of a stretching blow moulding machine according to the prior art.

FIG. 1 shows a machine 50 for processing containers. In this case the reference number 1 designates in its entirety an apparatus for shaping pre-forms 10 to form containers 20. Expressed in more precisely, the pre-forms 10 are supplied to this apparatus 1 by way of a first star wheel 54 and after that the pre-forms are shaped in the apparatus 1 to form containers 20, in which case they are conveyed during this shaping procedure on a conveying wheel 56 acting as a conveying device. The containers 20 produced in this way are then conveyed away by way of a further star wheel 53 (which is shown only in part). For the sake of simplicity only one apparatus 1 is illustrated.

Figure 2:
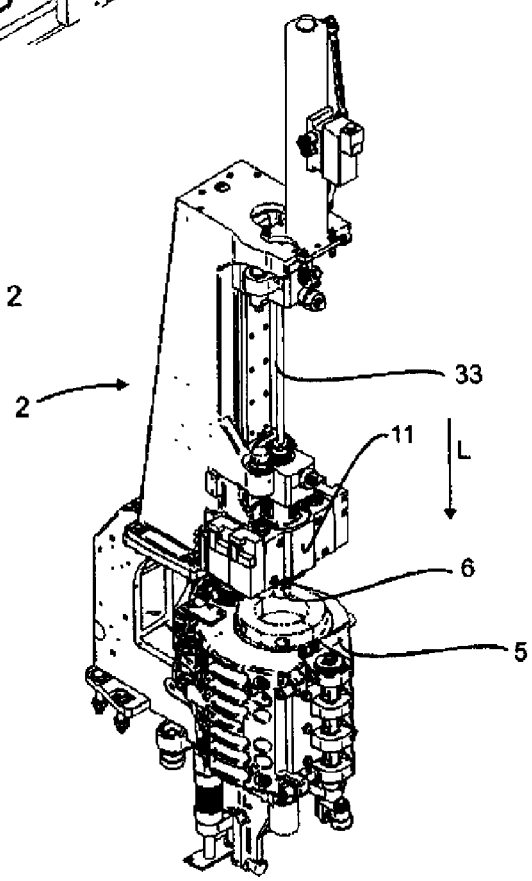
FIG. 2 is a view of a blowing device.

In this case the apparatus 1 has a blow mould 5 inside which the actual shaping procedure takes place. In addition, the apparatus has a rod member or a stretching rod 33, the upper end of which is arranged on a holding means 11. During the expansion procedure the holding means 11 moves downwards with the stretching rod 33 and in this way a stretching procedure of the pre-forms 10 in the longitudinal direction L thereof takes place (FIG. 2). At the same time, air is introduced into the pre-forms 10 by way of a blowing nozzle in order to expand these pre-forms 10. The reference 10a designates an aperture of the pre-form 10, by way of which the stretching rod 2 is introduced into the pre-form 10.

FIG. 2 is a detailed view of a blowing device according to the invention. In this case this blowing device has a blowing nozzle 6 which during the blowing procedure is applied to an aperture 10a of the container present inside a blow mould 5. This blowing nozzle 6 is also moved in a longitudinal direction L of the container.

FIG. 3 is a detailed view of a blowing device according to the invention, more specifically a support 4 on which a blowing nozzle designated 6 in its entirety is arranged. In this case it is evident that in this case a cross-section of this blowing nozzle 6 is enlarged towards the top from below and a portion of the support 4 is arranged in a transition region 6a. The reference number 22 relates to an engagement member which, as explained in greater detail below, acts as a means to prevent rotation between the blowing nozzle 6 and the support in an assembled state. In this case this engagement member 22 can be actuated manually in order to release this means to prevent rotation. The reference number 36 relates to two openings in the support 4, through which openings extends a pin or a shaft 34 which is shown in FIG. 5 and on which in turn the engagement member 22 is arranged.

FIG. 4 is a sectional view along the line A-A from FIG. 3 of the arrangement shown in FIG. 3. It is evident in this case that the support 4 has a connecting portion 14 which engages in the transition region 6a or in the interior thereof or a receiving region 16 of the blowing nozzle 6 adapted to this connecting portion. In this case it will likewise be seen that this connecting portion 14 has arranged on it a projection 42, or more precisely—as shown in FIG. 5—a plurality of projections 42, which engages or engage in a recess 38 in the receiving region 6a adapted accordingly. A tube member 40, which extends in the longitudinal direction L and the upper end of which has a connecting member or a flange 12, is arranged in the blowing nozzle 6, it being possible for this connecting member 12 to rest in turn on the support 4 in order to form a seal. This tube member 40, with which the connecting member 12 is formed in one piece, forms the nozzle element which is capable of being inserted into the aperture of a container at least in part.

A duct 8, along which a gaseous medium—such as for example air—can flow, is formed inside the support 4. Openings 28, which allow the air to flow out in part into an interspace 48 between the tubular member 40 and a peripheral wall 7 of the blowing nozzle, are arranged in turn in the tubular member 40. The connecting member 12 or the nozzle element 12, 40 respectively can be supported in this case with respect to a step 6b of the blowing nozzle and in this way the nozzle element in FIG. 4 is prevented from slipping downwards. The stretching rod can also move through this nozzle element 12, 40 or the tubular member 40 thereof respectively. In this case the tubular member 40 is also a component part of the blowing nozzle 6.

It will be additionally seen that the engagement member 22 is arranged so as to be pivotable about a shaft which extends through an opening 32. In addition, this engagement member 22 has an engagement portion which, as will be explained in greater detail below—engages in an area of the blowing nozzle 6 in a secured or assembled state. In this case a spring device 35 forces this engagement member 22 or the portion 24 of the engagement member 22 radially outwards, i.e. in the direction R. It will be additionally seen that the engagement portion 24 of the engagement member 22 is arranged at substantially the same height as a projection 46 (cf. FIG. 5) which is arranged on the blowing nozzle 6 and projects radially inwards.

FIG. 5 is an exploded view of a blowing device 2 according to the invention. In this case it is evident once again that the support 4 has a recess 26 in which the engagement member 22 is arranged so as to be pivotable. This recess 26 also extends into the region of a peripheral groove 43 formed above the projections 42. The reference number 34 designates the shaft which extends through the openings 36 and also through an opening 32 in the engagement member 22 in order to support the latter in a pivotable manner. In this way, this shaft 34 also acts as a retaining means which prevents the engagement member from falling out of the support 4. A tube member 52, through which blown air can pass, is arranged in the interior of the blowing nozzle 6. In addition, this tube member 52 also allows a stretching rod (not shown) to pass through.

The reference number 18 relates to a sealing element, such as an O-ring or a steel ring, which is used for sealing off the nozzle with respect to a container during the blowing procedure. In addition, it would be possible for a further sealing element (not shown) to be provided, which seals off the support 4 with respect to the nozzle element 12, 40.

In this case, in the assembled state the tube member 52 and the flange or the connecting member 12 respectively are pressed against each other in order to achieve a sealing effect in this way. The engagement portion 24 can engage in a corresponding engagement recess 45 which is arranged on the projection 46. The reference number 47 relates to a head of the blowing nozzle 6.

In this case it would be possible for suitable recesses 45 also to be arranged on the other projections 46. Prevention of rotation is made possible by this engagement. For assembly, the blowing nozzle 6 is pushed onto the support 4, or expressed more precisely, over the connecting portion 14, in which case it is precisely this relative rotational setting between the blowing nozzle 6 and the support 4 which has to be taken into consideration, so that the two elements can be guided one in the other, it being possible for the projections 42 to pass through recesses 44 between the projections 46 of the blowing nozzle.

After that the blowing nozzle 6 is rotated with respect to the support 4, so that co-operation of the projections 42 and the projections 46 results in the blowing nozzle 6 holding on the support 4 in the longitudinal direction. In this case it would also be possible for example for the projections 43 to be arranged slightly obliquely in the longitudinal direction L, so that as a result of a rotation of the blowing nozzle 6 with respect to the support 4 the blowing nozzle 6 is also pressed slightly against the support 4 in the longitudinal direction L, in order to increase the sealing effect in this way.

All the features disclosed in the application documents are claimed as being essential to the invention, insofar as they are novel either individually or in combination as compared with the prior art.

What is claimed is:

1. A stretching blow moulding machine for shaping plastics material pre-forms into plastics material containers, comprising:
   a blowing device which acts upon the plastics material pre-forms with a gaseous medium in order to expand the plastics material pre-forms to form plastics material containers, the blowing device including
      a blowing nozzle which is capable of being applied to an aperture of the plastics material pre-forms in order to act upon them with the gaseous medium, and
      a support for the blowing nozzle, through which the gaseous medium is capable of flowing, and
   a connecting mechanism in order to arrange the blowing nozzle on the support in a detachable manner,
   wherein the blowing nozzle is capable of being removed from the support without any tools.

2. A stretching blow moulding machine according to claim 1, wherein the connecting mechanism is designed in such a way that the blowing nozzle is capable of being removed by a relative movement between the blowing nozzle and the support.

3. A stretching blow moulding machine according to claim 2, wherein the blowing nozzle is capable of being detached from the support by a relative movement between the blowing nozzle and the support, said movement encompassing an angle of rotation of less than 360°.

4. A stretching blow moulding machine according to claim 3, wherein said movement encompasses an angle of rotation of less than 180°.

5. A stretching blow moulding machine according to claim 4, wherein said movement encompasses an angle of rotation of less than 120°.

6. A stretching blow moulding machine according to claim 1, wherein the blowing nozzle is capable of being withdrawn from the support.

7. A stretching blow moulding machine according to claim 1, wherein an engagement portion, which in an assembled state of the support and the blowing nozzle engages in a receiving area of the blowing nozzle, is arranged on the support.

8. A stretching blow moulding machine according to claim 1, wherein an engagement member capable of being moved radially with respect to the blowing nozzle is arranged on the support.

9. A stretching blow moulding machine according to claim 8, wherein the engagement member has an engagement portion which engages in an area of the blowing nozzle in an assembled state of the blowing nozzle and the support.

10. A stretching blow moulding machine according to claim 8, wherein the support has a recess in which at least one portion of the engagement member is arranged.

11. A stretching blow moulding machine according to claim 8, wherein a spring element is provided, which pre-stresses the engagement member with respect to the support.

12. A stretching blow moulding machine according to claim 8, wherein the support has a retaining means which prevents the engagement member from falling out of the support.

13. A stretching blow moulding machine according to claim 8, wherein the engagement member is arranged so as to be pivotable about a pre-set pivot axis.

14. A stretching blow moulding machine according to claim 8, wherein at least one engagement member, the external cross-section of which is adapted to an internal cross-section of at least one engagement recess arranged on the blowing nozzle, is arranged on the support.

15. A stretching blow moulding machine according to claim 1, wherein a sealing element is provided which seals off the support with respect to the blowing nozzle.

16. A blowing device for a stretching blow moulding machine, which acts upon plastics material pre-forms with a gaseous medium in order to expand the plastics material pre-forms into plastics material containers, the blowing device comprising:
   a blowing nozzle which is capable of being applied to an aperture of the plastics material pre-forms in order to act upon them with the gaseous medium;
   a support for the blowing nozzle, which support is capable of having the gaseous medium flow through it;
   a connecting mechanism in order to arrange the blowing nozzle on the support in a detachable manner, wherein the blowing nozzle is capable of being removed from the support without any tools; and
   an engagement member arranged on the support, the engagement member being movable radially with respect to the blowing nozzle.

17. An apparatus for shaping plastics material pre-forms into plastics material containers, comprising:
   a blowing device configured to act upon plastics material pre-forms with a gaseous medium in order to expand the plastics material pre-forms to form plastics material containers, the blowing device including
      a blowing nozzle configured to be applied to an aperture of the plastics material pre-forms in order to act upon them with the gaseous medium, and
      a support for the blowing nozzle, through which the gaseous medium is capable of flowing;
   a connecting mechanism configured to detachably couple the blowing nozzle with the support, the blowing nozzle being removable from the support without any tools; and
   an engagement member arranged on the support, the engagement member being movable radially with respect to the blowing nozzle.

18. An apparatus according to claim 17, wherein the connecting mechanism is designed in such a way that the blowing nozzle is capable of being removed by a relative movement between the blowing nozzle and the support.

* * * * *